R. BECKER.
STEERING WHEEL LOCK.
APPLICATION FILED JAN. 6, 1920.
1,368,382.
Patented Feb. 15, 1921.
2 SHEETS—SHEET 1.
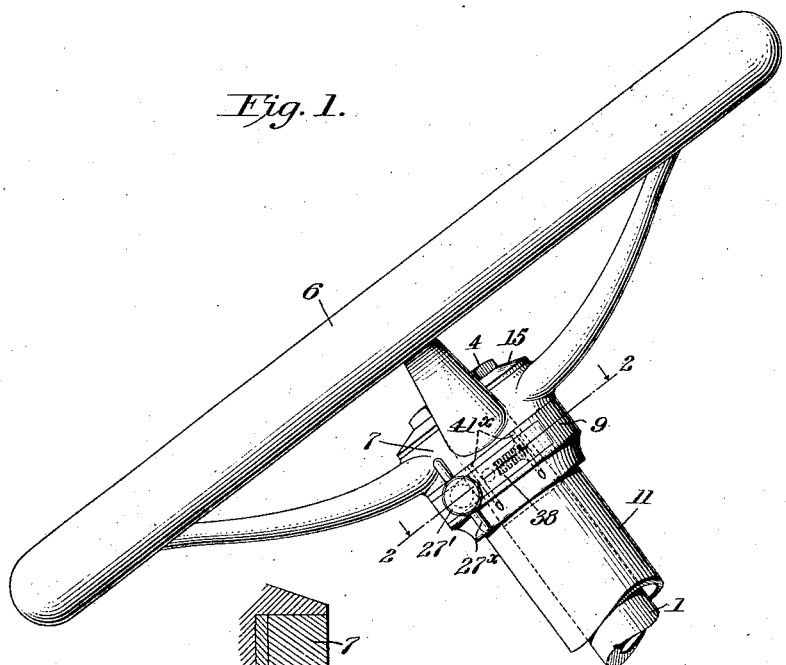
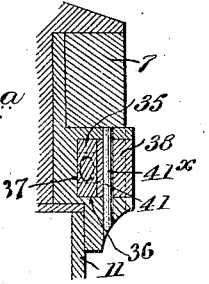
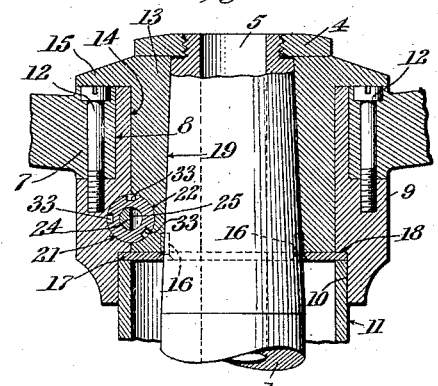
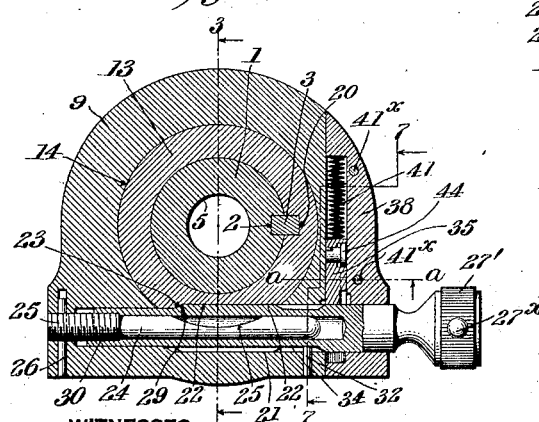
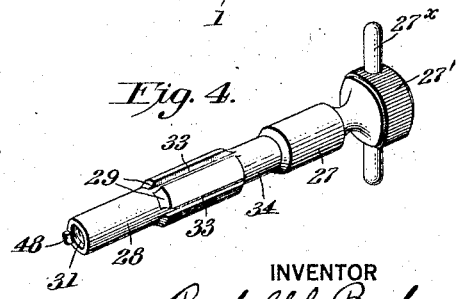
WITNESSES:
L. E. Fischer
Marll Davis
INVENTOR
Rudolph Becker,
BY John F. Heing,
ATTORNEY

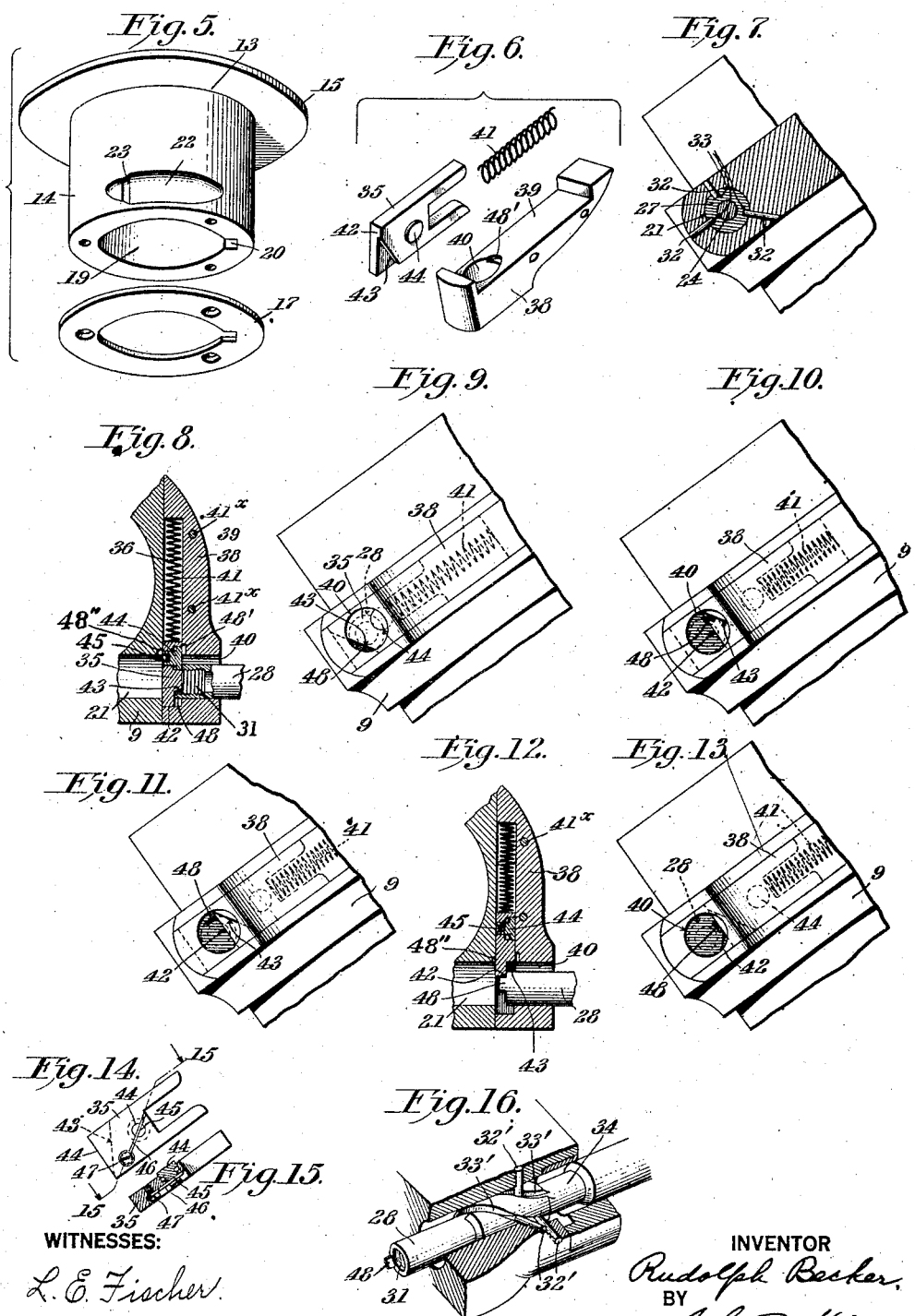

UNITED STATES PATENT OFFICE.

RUDOLPH BECKER, OF ROSELLE PARK, NEW JERSEY.

STEERING-WHEEL LOCK.

1,368,382.

Specification of Letters Patent.  Patented Feb. 15, 1921.

Application filed January 6, 1920. Serial No. 349,784.

*To all whom it may concern:*

Be it known that I, RUDOLPH BECKER, a citizen of the United States, residing at Roselle Park, in the county of Union and State of New Jersey, have invented certain new and useful Improvements in Steering-Wheel Locks, of which the following is a specification, reference being had therein to the accompanying drawings.

This invention relates to locking devices adapted more particularly for preventing the use of automobiles by unauthorized persons.

It has heretofore been proposed to provide key-controlled means for unlocking the steering wheel of an automobile from the steering post for the purpose of rendering the steering gear inoperative to direct the course of the vehicle, thus preventing use of the vehicle by a person not in possession of the key. The various devices of this type, however, with which I am familiar, possess a disadvantageous feature, in that the steering wheel is locked to the steering post by means of a key-controlled slide-bolt which is projected into a radial notch in the steering post, whereby considerable lost motion between the wheel and post, with its accompanying annoyance, develops. This lost motion grows worse as the bolt and notch suffer wear and tear from the repeated sliding of the bolt and from the pounding action of the side walls of the notch upon the sides of the bolt during the normal operation of the vehicle.

The present invention has for an object to provide a key-controlled locking connection between a steering post and wheel of such a nature that a person in possession of the key may, at a moment's notice, tightly and rigidly fix or connect these parts together, to the exclusion of all lost motion; the wheel being perfectly free to turn relatively to the steering post when unlocked from the latter.

A further object of the invention is to provide the device in the form of a simple and inexpensive attachment readily applicable to the steering gear commonly in use.

Still further, the invention has for an object to provide the lock in such form that it cannot be manipulated to connect the wheel and post by a person not in possession of the proper key, the nature of the key being such that individual characteristics may be readily imparted to it, distinguishing it from all other similar keys and rendering it useful in manipulating only the individual lock for which it was made.

The invention also aims to gain the desired safety from manipulation by unauthorized persons, without necessitating the incorporation of expensive tumbler-lock mechanisms, such as have been provided in many prior steering gear locks.

Further objects of the invention will appear from the following description and claims.

The invention, in its broader aspects, consists essentially in providing a readily removable and replaceable key for locking the hub of the steering wheel to the steering post, the key itself serving to transmit motion from the wheel to the post and the bearing between the wheel and post being adapted to permit free turning of the wheel on the post when the key is removed.

Preferably the device is made up in the form of an attachment comprising inner and outer hubs with a cylindrical bearing surface therebetween; the inner hub being adapted to be keyed rigidly to the tapered upper end portion of the usual steering post and the outer hub being adapted to be fixedly secured to and made a part of the steering wheel. These hubs are provided with an aperture or key-way which is substantially tangential to the cylindrical bearing surface therebetween; both hubs being cut away to form the key-way, whereby when the key is inserted movement of one hub relative to the other is prevented and the two are firmly and tightly locked together.

A feature of importance lies in the provision of a threaded connection between the outer hub and the key, whereby the key may be tightened to final position; the size of the inner end of the key-way being reduced at a point such as to afford a shoulder in the notched portion of the inner hub, and the inserted end of the key being correspondingly reduced in size to afford a complemental shoulder, whereby, as the key is turned to force it to final position, the shouldered portion of the key is forced against the shouldered portion of the notch in the inner hub and a slight relative turning movement of the two hubs is effected, thus tightly and securely cramping all the parts together and rendering them as solid as an integral construction without gripping the key in such a manner that it cannot be readily withdrawn when desired.

A fuller understanding of the invention may be had from the accompanying drawings in which Figure 1 is a side elevation of an automobile steering wheel and post embodying the invention. Fig. 1ª is a fragmentary sectional view on the line a—a, Fig. 2. Fig. 2 is a section on the line 2—2, Fig. 1. Fig. 3 is a vertical section on the line 3—3, Fig. 2. Fig. 4 is a perspective view of the key-pin shown in Figs. 1, 2 and 3. Fig. 5 is a disassembled perspective view of the parts of the inner hub member; the fastening screws being omitted. Fig. 6 is a disassembled perspective view of the parts of the key-way closing device. Fig. 7 is a fragmentary section on the line 7—7, Fig. 2. Fig. 8 is a fragmentary section similar to Fig. 2 but showing the key-way closed and the tip end of the key in first position preparatory to opening the key-way. Figs. 9, 10 and 11 are fragmentary elevations similar to Fig. 1, but illustrating subsequent stages of the operation of opening the key-way by manipulation of the key. Fig. 12 is a view similar to Fig. 8 with the parts in the position illustrated in Fig. 11. Fig. 13 is a view similar to Fig. 11, showing the key-way opened sufficiently to pass the key. Fig. 14 is a rear side elevation of the key-way closing slide. Fig. 15 is a section on the line 15—15, Fig. 14 and Fig. 16, is a perspective view illustrating a modified form of key and key-way with spirally arranged coacting groove and projection means for preventing insertion of a key not having the proper characteristics.

In the particular embodiment of the invention chosen for the purposes of the present disclosure, 1 represents the steering post of an automobile which is tapered, as usual, at its upper end and is formed with the usual key-way 2 for the key 3 which enters a slot in the hub of the usual steering wheel and locks the latter to the steering post; the usual nut 4 serving to force the hub of the steering wheel tightly upon the post which may be formed with the longitudinal aperture 5 for the usual spark and gas controlling shafts, not shown.

In the present instance, wherein the invention is embodied in the form of an attachment, the steering wheel 6 is found with a hub 7 which is apertured at 8 to receive the reduced upper end-portion of the outer hub member 9 which is bored out at 10 to freely receive and fit over the usual stationary casing 11 for the steering post 1. A plurality of screws 12 serve to fixedly secure the outer hub-member 9 to the hub 7 of the steering wheel 6 and, in effect, make said outer hub-member an integral part of the steering wheel.

Disposed within the outer hub-member 9 is an inner hub-member 13; the bearing surfaces 14 between said hub-members being preferably truly cylindrical. The inner hub-member 13 is formed at its upper end with a flange 15 which covers and conceals the screws 12 and neatly finishes off the exposed upper portion of the device as a whole. Secured to the faced off lower end of the inner hub-member 13, by screws 16, is the retaining ring 17, the peripheral portion of which extends outwardly beyond the bearing surface 14 and forms an annular supporting bearing 18 for the outer hub-member 9. The external diameter of the retaining ring 17 is preferably equal to that of the casing 11 so that it may fit nicely, although freely, within the bore 10 of the outer hub-member. The inner hub-member 13 is formed with a taper-bore 19 and key-way 20 so that it may be fixedly secured to the steering post 1 by means of the usual key 3 and nut 4. Thus the inner hub-member, in effect, becomes an integral part of the steering post 1.

It is important that the outer hub-member be freely journaled upon the inner hub-member so as to turn easily upon the latter even though subjected to considerable pressure axially of the steering post, and while I prefer to employ the truly cylindrical bearing 14 and transverse supporting bearing 18 arranged in a plane at right angles to the bearing 14, I realize that the necessary freedom for relative turning movement between the two hub-members may be secured even though other selections of the bearing surfaces be made. Slightly tapered bearing surfaces with freedom for relative axial movement, whereby a wedging or gripping action is evidenced, should preferably be avoided.

In the present embodiment of the invention, the outer hub-member 9 is provided with a cylindrical bore or key-way 21 which is disposed transversely of the axis of the hub-members and in non-intersecting relation with said axis. In other words the key-way 21 is not directed radially toward the axis of the steering wheel but is directed to one side of such axis and is preferably substantially tangential to the bearing surface 14, as shown in Fig. 2. The inner hub-member is formed with a tangential cylindrical notch 22 adapted to register with and form a part of the key-way 21, as shown in Figs. 2, 3 and 5. The inner end portion of the key-way 21 is reduced in size to afford a preferably tapered shoulder 23 in the notched portion of the inner hub-member 13.

Although not essential to the invention, in its broader aspects, I prefer to provide the key-way 21 with a centrally disposed cylindrical pin 24 which is cut away at 25 to clear the inner hub-member 13 when the outer hub-member is turned relative thereto. The pin 24 is fixed at its inner end to the outer hub-member 9 in any suitable manner, as by means of the screw threaded connection 25 and transverse pin 26; the pins 24 and 26 being ground off flush with the outer surface of the outer hub-member and being made of the same material, whereby their presence is concealed.

The key for locking the inner and outer hub-members together is preferably made up in the form of a hollow cylindrical pin 27 adapted to slide nicely within and substantially fill the key-way 21; said key being formed with a head 27' and cross-pin 27ˣ facilitating manipulation thereof. The inner end 28 of the key 27 is reduced in size to fit the reduced inner end of the key-way and to afford a preferably tapered shoulder 29 complementary to the shoulder 23 in the notched portion 22 of the inner hub-member. A relatively short screw-threaded connection 30, Fig. 2, is provided between the key 27 and the outer hub-member for the purpose of tightening the key to final position. This connection may conveniently be provided by tapping the inner end of the key, as at 31, Fig. 4, whereby it may be screwed upon the threaded inner end of the pin 24. Thus the key 27 may be inserted for substantially its full length into key-way by an endwise sliding motion and then tightened to final position by giving it a turn or two.

An important feature of the invention is the exclusion of all lost motion between the hub-members when they are locked together by means substantially as described. It will be noted that as the key is turned to draw it to final position, the shoulder 29 is tightened against the shoulder 23 thus tending to turn the inner hub-member 13 relatively to the outer hub-member 9 and causing the cylindrical wall of the notch 22 to press tightly upon the cylindrical wall of the key 27, thereby taking up any lost-motion which there may be between the parts and cramping them tightly together as an integral whole. This cramping action is, however, not so great as to prevent ready withdrawal of the key when it is desired to render the steering gear inoperative to direct the course of the vehicle. Thus the key 27 itself serves, when in position, to transmit motion from the steering wheel to the post 1; the wheel being perfectly free to turn relative to the post when the key is withdrawn.

I prefer to individualize the key 27 by providing circumferentially spaced complemental notch and projection means; the projections consisting preferably of the pins 32, Fig. 7, which project radially into the key-way 21, and the notches consisting of grooves 33 cut longitudinally of the key 27 which latter is reduced in size at 34 to clear the pins 32 when the key is fully inserted preparatory to turning same to final position. The notches and projections may be angularly spaced about the axis of the key-way in accordance with any desired predetermined combination and it will be evident that insertion of a similar key having differently spaced notches is prevented.

The key may be further individualized by cutting the grooves in spiral formation, as illustrated at 33', Fig. 16, a plurality of pins 32' being arranged at the proper pitch to engage one of said grooves, said pins, in effect, constituting a spiral projection complementary to the spiral groove.

The entrance to the key-way 21 is preferably closed by means of a transverse spring-pressed slide-plate 35 freely fitted within a concealed slideway 36 afforded by cutting away or slotting the outer hub-member 9 at 37, Fig. 1ᵃ, and fitting a retainer block 38 to said slot; the inner side of the retainer block 38 being cut away at 39 to receive the slide 35, and also being formed with an aperture 40 in register with and constituting a portion of the key-way 21. A spring 41 serves to yieldingly force the slide 35 to a position closing the key-way 21, as shown in Fig. 8. The retainer block 38 is fixed to the hub-member 9 by means of the pins 41ˣ. The slide 35 is provided with a square shoulder 42 and an inclined shoulder 43, the latter extending across the aperture 40, as shown in Fig. 9, when the slide is in closed position.

In order to prevent an unauthorized person from readily pushing back the slide to gain access to the key-way 21, I prefer to provide the slide 35 with means for locking it in closed position. The locking means may comprise a spring-pressed pin 44 carried by the slide and having a length equal to the thickness of the slide. The inner end of the pin 44 is notched at 45 to receive the free end of a spring 46 secured at its opposite end to the slide 35 by means of the screw 47. The spring 46 tends to project the pin into the notch 48' in the retainer block 39 when the slide is in closed position, Fig. 8. To open the slide it is therefore necessary to push in the pin 44 until it is exactly flush with the slide and then lift the slide by some means engaging the inclined lifting shoulder 43. If the pin 44 is pushed in too far it will enter the recess 48'' at the rear of the slide 35 and lock the latter as firmly as through the pin were not depressed at all. Thus a special implement is required to open the key-way and the key 27 is preferably provided with the necessary means.

By referring to Figs. 4 to 8, it will be seen that the free end of the key 27 is formed with a projection 48 of a length not greater than the height of the inclined shoulder 43. Thus, when the key is inserted in the entrance 40 to the key-way 21, the projection 48 may be positioned in engagement with the inclined shoulder 43 while the end of the key presses the cross pin 44 exactly flush with the slide 35.

The key is then turned a fraction of a revolution in a clockwise direction to lift the slide to the position shown in Fig. 10. The key is then reversely turned, while held pressed against the slide whereby the friction of the slide 35 in its slideway holds the slide stationary while the projection 48 slips past the square shoulder 42 to the position shown in Figs. 11 and 12. The key is then turned clockwise to the position shown in Fig. 13 wherein the slide is shown as lifted sufficiently to pass the key.

It is to be understood that the invention is not limited to the exact form and arrangement of parts shown and described. Neither is it limited to the employment of the various safety features which I have pointed out as being desirable. So far as I am aware, I am the first to provide a steering wheel, which turns freely on the steering post, with a readily removable tangential key for locking the wheel to the post and excluding all lost motion. I therefore desire that the broad scope of the present improvement be borne in mind when construing the appended claims.

Having thus set forth the nature of the invention, what I claim herein is:—

1. A steering wheel locking device having, in combination, inner and outer hub-members with an annular supporting bearing for the outer hub-member permitting free turning movement of the latter relative to the inner hub-member, a key-pin directed transversely and to one side of the axis of said hub-members for locking them together against relative turning movement, said key-pin being constructed and adapted for ready removal from said hub-members by an endwise movement, while said hub-members are in assembled relation.

2. A steering mechanism having, in combination, a tangentially notched inner hub-member adapted to be fixed to a steering post, a steering wheel mounted upon said inner hub-member and formed with an outer hub-member which is apertured in register with the notch in said inner hub-member, and a key-pin received within said aperture and notch for locking the wheel against turning movement relative to the post, said key-pin being adapted to be readily removed from and replaced in said hub-members while said hub-members are in assembled relation.

3. A steering mechanism comprising, a steering post having at its upper end a hub-member formed with a tangential notch, a steering wheel having a hub-member journaled on said first mentioned hub-member and formed with an aperture adapted to register with said notch, a pin fixed at one end to the hub-member of the wheel and extending axially of said aperture, and a key having an axial aperture receiving said fixed pin and adapted to enter said first mentioned aperture and notch to lock said hub-members together.

4. A steering mechanism comprising, a steering post having at its upper end a hub-member formed with a tangential notch, a steering wheel having a hub-member journaled on said first mentioned hub-member and formed with a cylindrical aperture adapted to register with said notch, a pin fixed at one end to the hub-member of the wheel and extending axially of said aperture, a cylindrical key having an axial aperture receiving said fixed pin and adapted to enter said cylindrical aperture and notch to lock said hub-members together, and a screw threaded connection between said fixed pin and key.

5. A steering mechanism comprising, a steering post having at its upper end a hub-member formed with a tangential notch, a steering wheel having a hub-member journaled on said first mentioned hub-member and formed with an aperture adapted to register with said notch, a readily removable key pin received within said aperture and notch for locking said hub-members together, the bearing between said hub-members being such as to permit free turning movement of one hub-member relative to the other when the key-pin is withdrawn, and means for automatically closing the key aperture when the key is removed.

6. A locking attachment comprising, inner and outer hub-members having a cylindrical bearing surface therebetween, said hub-members being both cut away to form a cylindrical key aperture the axis of which is substantially tangential to said surface, a cylindrical key-pin slidable endwise within said aperture for locking said hub-members together against relative turning movement, said key-pin being constructed so as to permit of its ready removal from said hub-members while the latter are in assembled relation, whereby to unlock said hub-members.

7. A locking attachment comprising, inner and outer hub-members having a cylindrical bearing surface therebetween, said hub-members being both cut away to form a key aperture the axis of which is substantially tangential to said surface, a key-pin slidable endwise within said aperture for locking said hub-members together, said key and inner hub-member being formed with coacting shouldered portions, and means associated with said key for holding the latter in locking position.

8. A locking device comprising, inner and outer hub-members having a cylindrical bearing surface therebetween, said hub-members being both cut away to form a cylindrical key aperture the axis of which is substantially tangential to said surface, a cylindrical key-pin slidable endwise within said aperture for locking said hub-members together, and screw means for tightening the key-pin in locking position.

9. A locking attachment comprising, inner and outer hub-members having a cylindrical bearing surface therebetween, said hub-members being both cut away to form a cylindrical key aperture the axis of which is substantially tangential to said surface, and a cylindrical key-pin for locking said hub-members together, said key and inner hub-member being formed with coacting shouldered portions, there being a relatively short screw threaded connection between said hub-member and key distinct from said shouldered portion for tightening the latter together.

10. The combination in a steering wheel of inner and outer hub-members having registering recesses, of a readily removable key-pin slidably received within said recesses for locking the hub-members against relative turning movement, said key and the wall of said recess being formed with circumferentially spaced complemental notch and projection means preventing effective insertion of a similar key not possessed of the predetermined characteristics of the original key.

11. The combination in a steering wheel of inner and outer hub-members having registering recesses, of a readily removable key-pin slidably received within said recesses for locking the hub-members against relative turning movement, said key and recess being of complementary irregular shape in cross section at points along the length of each, such that effective insertion of a similar key not possessed of the predetermined characteristics of the original key is prevented.

12. The combination in a steering wheel of inner and outer hub-members having registering cylindrical recessed portions, of a readily removable cylindrical key slidably received within said recessed portions for locking the hub-members together, the recessed portion of one hub-member being formed with circumferentially spaced inwardly projecting pins and the body of the key being formed with similarly spaced longitudinally extending grooves, whereby insertion of a similar key having differently spaced grooves is prevented.

13. The combination in a steering wheel of inner and outer hub-members having registering cylindrical recessed portions, of a readily removable cylindrical key slidably received within said recessed portions for locking the hub-members together, the recessed portion of one hub-member being formed with circumferentially spaced inwardly projecting pins and the body of the key being formed with similarly spaced longitudinally extending grooves, whereby insertion of a similar key having differently spaced grooves is prevented, and means between said pins and the entrance of the recess in the wheel for automatically closing said recess when the key is withdrawn.

14. A locking attachment comprising inner and outer hub-members with a bearing therebetween, a removable key for locking said members together, a slide for closing the key-way when the key is withdrawn, and means for locking said slide in closed position.

15. A locking attachment comprising inner and outer hub-members with a bearing therebetween, a removable key for locking said members together, a slide for closing the key-way when the key is withdrawn, and means for locking said slide in closed position, said key-pin being provided with means for unlocking and lifting said slide preparatory to insertion of the key.

16. The combination with a lock having a cylindrical key hole and a spring-pressed slide for closing said key-hole said slide having a lifting shoulder and carrying a transverse spring-pressed pin of a length equal to the thickness of said slide, said pin acting to lock said slide in closed position, of a key formed with an eccentric lifting projection and an end surface adapted to depress said transverse pin until its opposite ends are flush with the opposite side surfaces of said key-hole closing slide.

17. A locking attachment comprising inner and outer hub-members having a cylindrical bearing surface therebetween, said hub members being both cut away to form an elongated key aperture which is substantially tangential to said surface, a key-pin slidable endwise within said aperture while said hub-members are in assembled relation, for locking said hub members together against relative turning movement, said key-pin being formed with a tapered portion adapted to coact with the inner hub member for tightening the parts together when the key is tightened endwise, and means for forcing the key endwise to tighten the same in inserted position.

18. A locking device comprising inner and outer body-members having a bearing surface therebetween, said members being both cut away to form a cylindrical key aperture, the axis of which is substantially tangential to said bearing surface, and a cylindrical key-pin for locking said body-members together against relative turning movement, said key-pin and inner hub-member being formed with coacting shouldered portions, and a screw connection for forcing the key-pin endwise to final position.

In testimnoy whereof, I have signed my name to this specification.

RUDOLPH BECKER.